(No Model.)

J. JUDGE.
BICYCLE SUPPORT.

No. 586,040. Patented July 6, 1897.

WITNESSES:

INVENTOR
J. Judge.
BY
ATTORNEYS.

UNITED STATES PATENT OFFICE.

JAMES JUDGE, OF NEW YORK, N. Y.

BICYCLE-SUPPORT.

SPECIFICATION forming part of Letters Patent No. 586,040, dated July 6, 1897.

Application filed April 10, 1896. Serial No. 586,981. (No model.)

*To all whom it may concern:*

Be it known that I, JAMES JUDGE, of New York city, in the county and State of New York, have invented a new and Improved Bicycle-Support, of which the following is a full, clear, and exact description.

This invention relates particularly to devices for supporting a bicycle in an upright position; and the object is to provide a device whereby a bicycle may be supported laterally while a person is learning to ride, thus rendering it practically safe for a learner.

I will describe a support embodying my invention, and then point out the novel features in the appended claim.

Reference is to be had to the accompanying drawings, forming a part of this specification, in which similar characters of reference indicate corresponding parts in all the views.

Figure 1:
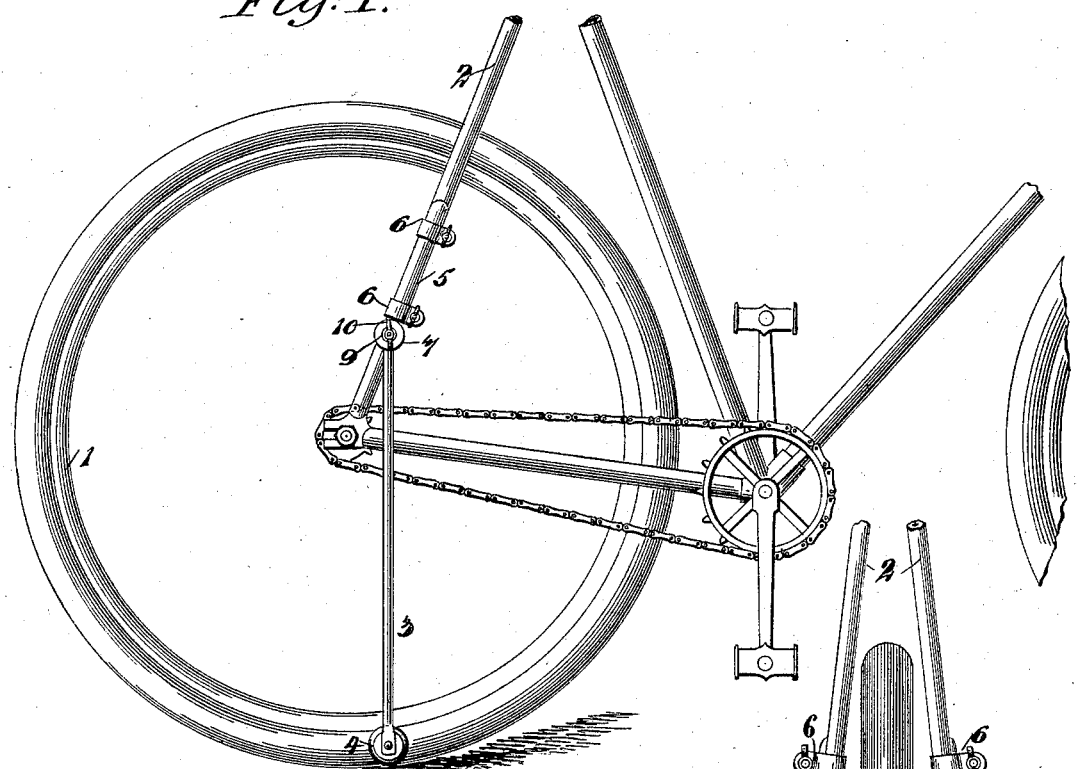
Figure 4:
Figure 3:
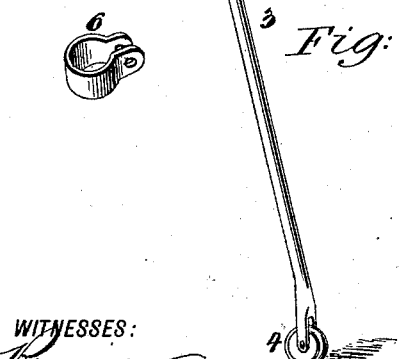
Figure 2:
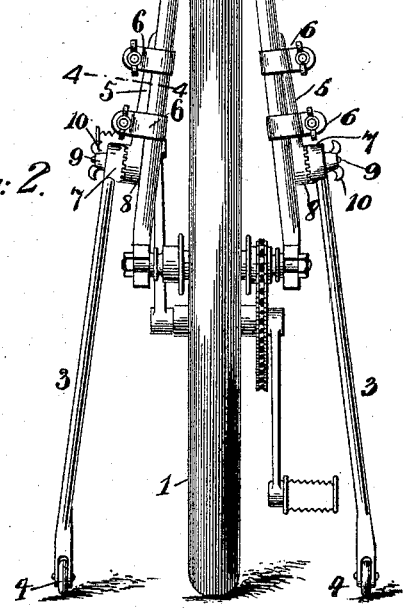

Figure 1 is a side elevation of a portion of a bicycle, showing my invention as applied thereto. Fig. 2 is a rear elevation thereof. Fig. 3 shows the device in detail, and Fig. 4 is a section through the line 4 4 of Fig. 2.

Referring to the drawings, 1 designates the rear wheel of a bicycle, and 2 indicates the rear fork of the frame, to each member of which a supporting device is designed to be attached. It is to be understood, however, that I do not confine the attachment of my invention to the rear fork, as it may be attached to some other member or members of the frame and serve to support the bicycle laterally.

As here shown, each supporting device comprises a rod 3, extended downward from a member of the rear fork and having a roller 4 at its lower end, which, preferably, is provided with a cushioned or rubber tire. The rod 3 is attached to an arm 5, adapted to be removably attached to a member of the rear fork 2 by means, as here shown, of clamping-rings 6. The arm 5 is preferably made tapering toward its upper end, so that pressure will have a tendency to make a firmer connection between the arm and fork member. The inner surface of the arm is transversely concaved to conform to the shape of the fork members.

To adapt the support to different bicycles or to the pitch of the fork, I provide an adjustable connection between the rod 3 and arm 5. As here shown, this connection consists of a clutch member 7 on the rod 3, having teeth to engage between teeth of a clutch member 8 on the arm 5. From the clutch member 8 a threaded bolt 9 extends through a perforation in the clutch member 7 and is engaged by a thumb-nut 10. Obviously by means of this clutch device the rod 3 may be adjusted and secured at any desired angle with relation to the arm 5.

It will be seen that the two supports diverge toward their lower ends, or extend in a line substantially parallel with the fork members, so that the rollers 4 will engage with the ground or floor at some distance from the wheel and thus provide a firm support at both sides of the bicycle.

Having thus described my invention, I claim as new and desire to secure by Letters Patent—

A bicycle-support, comprising supporting-rods, tapered arms connected with the rods, and clamping-bands for securing the arms to fork members of a bicycle-frame, substantially as specified.

JAMES JUDGE.

Witnesses:
JNO. M. RITTER,
C. R. FERGUSON.